US012671206B2

(12) United States Patent
Morrison et al.

(10) Patent No.: US 12,671,206 B2
(45) Date of Patent: Jun. 30, 2026

(54) TRANSITION COUPLING FOR TERMINATING CONNECTOR AND LIQUIDTIGHT CONDUIT FITTING

(71) Applicant: Service Wire Company, Culloden, WV (US)

(72) Inventors: Gary L Morrison, South Point, OH (US); Lee Allen Perry, Colloden, WV (US)

( * ) Notice: Subject to any disclaimer, the term of this patent is extended or adjusted under 35 U.S.C. 154(b) by 355 days.

(21) Appl. No.: 18/305,352

(22) Filed: Apr. 23, 2023

(65) Prior Publication Data

US 2023/0261412 A1 Aug. 17, 2023

Related U.S. Application Data

(63) Continuation of application No. 17/240,407, filed on Apr. 26, 2021, now Pat. No. 11,670,889, which is a continuation of application No. 16/797,325, filed on Feb. 21, 2020, now Pat. No. 11,018,447.

(60) Provisional application No. 62/859,808, filed on Jun. 11, 2019.

(51) Int. Cl.
*H01R 13/512* (2006.01)
*H01R 9/11* (2006.01)

(52) U.S. Cl.
CPC ............. *H01R 13/512* (2013.01); *H01R 9/11* (2013.01)

(58) Field of Classification Search
None
See application file for complete search history.

(56) References Cited

U.S. PATENT DOCUMENTS

| | | | |
|---|---|---|---|
| 2,286,827 | A | 6/1942 | Morrison |
| 2,355,403 | A | 8/1944 | Tripp |
| 2,446,387 | A | 8/1948 | Peterson |
| 2,621,703 | A | 12/1952 | Morrison |
| 2,858,358 | A | 10/1958 | Hawke |
| 2,953,627 | A | 9/1960 | Malneritch et al. |
| 3,526,871 | A | 9/1970 | Hobart |
| 3,699,238 | A | 10/1972 | Hansen |
| 3,773,109 | A | 11/1973 | Eberline |
| 3,833,754 | A | 9/1974 | Philbert |
| 4,005,820 | A | 2/1977 | Cress |
| 4,331,374 | A | 5/1982 | Phillips |
| 4,398,058 | A | 8/1983 | Gerth et al. |

(Continued)

OTHER PUBLICATIONS

CA Notice of Allowance dated Jul. 24, 2023 pertaining to CA application No. 3,135,635 filed Oct. 25, 2021, pp. 1-1.

*Primary Examiner* — Ross N Gushi
(74) *Attorney, Agent, or Firm* — Jaensson Law PLLC; Monika L. Jaensson, Esq.

(57) ABSTRACT

According to various embodiments, a cable and termination system includes a cable, a liquidtight conduit at least partially surrounding the cable, and a termination. The cable includes a cable core comprising three insulated phase conductors, three ground conductors, and filler interspersed within the cable core to force the ground connectors into symmetrical, geometric location with a corresponding phase conductor and a second phase conductor, and a cable wrap applied over the cable core. The termination includes a first connector, a second, reverse-threaded connector including an exterior metal body and a male metal body coupled with a collet sleeve. Various embodiments of the first connector are also described.

9 Claims, 7 Drawing Sheets

(56) References Cited

U.S. PATENT DOCUMENTS

| | | | | |
|---|---|---|---|---|
| 4,491,685 | A | 1/1985 | Drew et al. | |
| 4,600,806 | A | 7/1986 | Beretta | |
| 4,738,636 | A | 4/1988 | Bolante | |
| 4,794,490 | A | 12/1988 | Epstein | |
| 5,280,137 | A | 1/1994 | Ward | |
| 5,691,505 | A | 11/1997 | Norris | |
| 5,873,750 | A | 2/1999 | Cairns et al. | |
| 6,310,286 | B1 | 10/2001 | Troxel et al. | |
| 6,321,021 | B1 | 11/2001 | Cairns | |
| 6,796,821 | B2 | 9/2004 | Cairns et al. | |
| 7,166,802 | B2 | 1/2007 | Cusson et al. | |
| 7,309,835 | B2 * | 12/2007 | Morrison | H01B 9/02 174/77 R |
| 9,557,512 | B2 | 1/2017 | Toth et al. | |
| 9,601,914 | B2 * | 3/2017 | Chiu | H02G 15/007 |
| 9,673,605 | B2 | 6/2017 | Cairns | |
| 9,696,509 | B2 | 7/2017 | Kimbrell et al. | |
| 9,715,068 | B2 | 7/2017 | Cairns | |
| 9,896,845 | B2 | 2/2018 | Sorkin | |
| 10,422,969 | B2 | 9/2019 | Ramasubramanian | |
| 10,851,926 | B2 * | 12/2020 | Shemtov | H02G 3/0481 |
| 11,404,815 | B2 | 8/2022 | Ramasubramanian | |
| 2003/0168242 | A1 | 9/2003 | Whidden | |

* cited by examiner

TRANSITION COUPLING FOR TERMINATING CONNECTOR AND LIQUIDTIGHT CONDUIT FITTING

CROSS-REFERENCE TO RELATED APPLICATIONS

This application is a continuation of application Ser. No. 17/240,407, filed Apr. 26, 2021, which is a continuation of application Ser. No. 16/797,325, filed Feb. 21, 2020, now U.S. Pat. No. 11,018,447, issued on May 25, 2021, which claims the benefit of U.S. Provisional Application No. 62/859,808 filed Jun. 11, 2019.

FIELD

This disclosure relates to transition couplings and, more particularly, transition couplings useful with liquidtight conduit.

BACKGROUND

Adjustable Speed Drives (ASDs, also known as Variable Frequency Drives) supply power from a power junction box to an ASD motor control center and provide a low-impedance ground path for common mode currents generated by ASDs. Asymmetrical phase conduction inherent in ASD designs require multiple, geometrically placed grounding conductors for conducting low frequency noise. Additionally, internal vibrations of the drive and motor assembly can impact the long-term connection viability of the cable and termination. However, existing terminations and connectors for ASD cabling are designed to have a direct connection with a cable, rendering them unsuitable for use in installations where conduit exists.

Accordingly, the need exists for alternative connectors that enable coupling of a cable to an electrical panel, enclosure, junction box, or equipment through a conduit, such as a liquidtight conduit.

SUMMARY

Various embodiments disclosed herein meet these needs by providing cable and termination systems including a termination comprising a first connector and a second, reverse-threaded connector comprising an exterior metal body and a male metal body coupled with a collet sleeve. The first connector includes features, such as a nut, that enables coupling of the termination with a conduit or liquidtight fitting, thereby affixing the conduit to the connector while maintaining the connector's 360° shield termination. Furthermore, the termination system can enable a safe transition connection for multiple types of conduit, as will be described in greater detail below.

Additional features and advantages of the embodiments disclosed herein will be set forth in the detailed description, which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Figure 1:
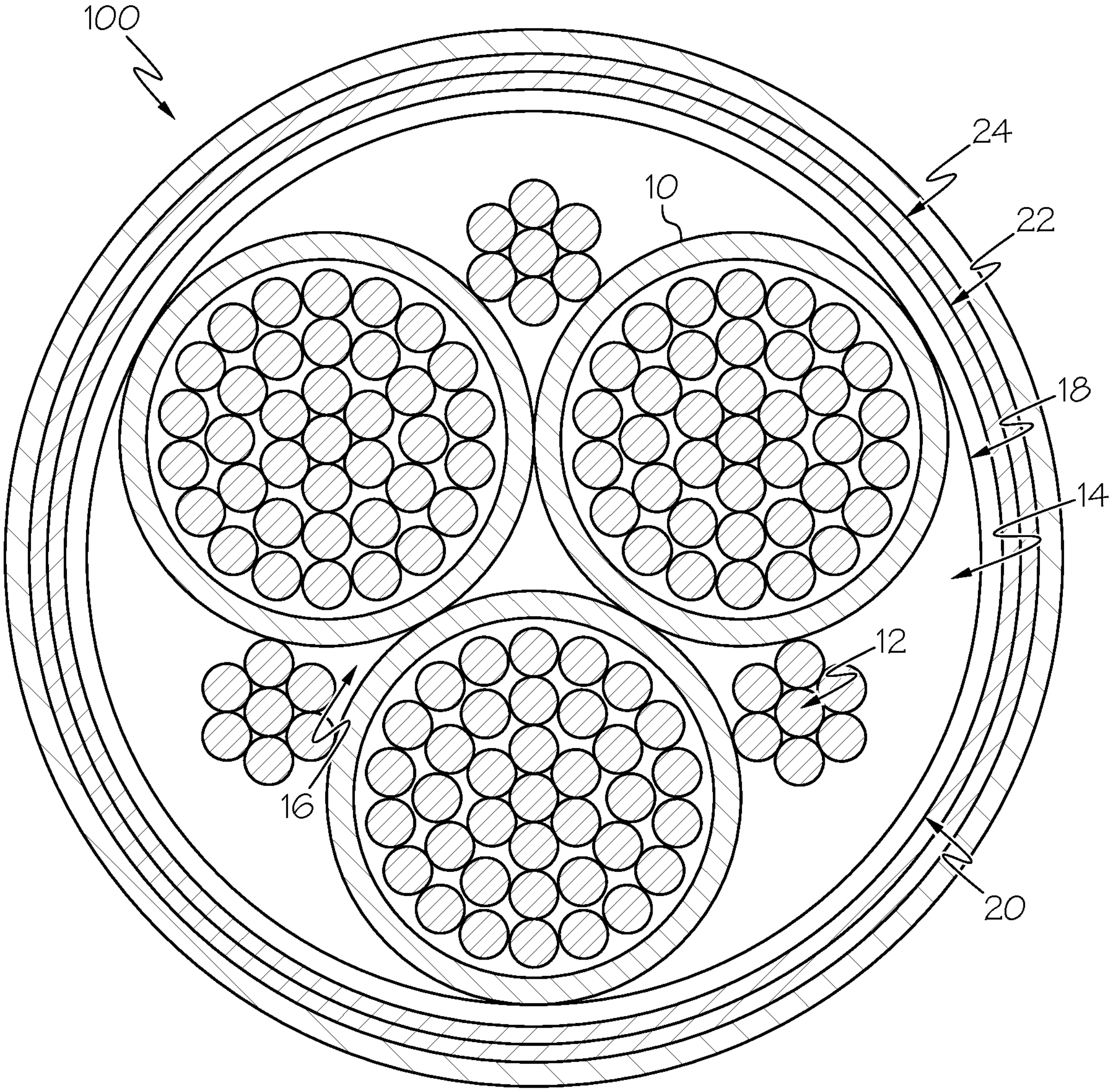
FIG. 1 illustrates a cross-section of an embodiment of a metal clad (MC) cable according to one or more embodiments shown and described herein.

Reference will now be made in detail to the present preferred embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, for example by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

Various embodiments described herein include cable and termination systems including a termination comprising a first connector and a second, reverse-threaded connector comprising an exterior metal body and a male metal body coupled with a collet sleeve. The first connector includes features, such as a nut, that enables coupling of the termination with a conduit or liquidtight fitting, thereby affixing the conduit to the connector while maintaining the connector's 360° shield termination. Furthermore, the termination system can enable a safe transition connection for multiple types of conduit, as will be described in greater detail below.

Illustrated in FIG. 1 is a cross-section of an embodiment of a cable core of a metal-clad cable ("MC cable") 100. As shown in FIG. 1, the cable core includes three phase conductors 10, three ground conductors 12, and filler 14. Each ground conductor 12 corresponds with one of the phase conductors 10, respectively, and is in intimate contact with the corresponding phase conductor and a second conductor. Each phase conductor 10 is a soft-drawn tinned or bare copper conductor, such as a Class B stranded conductor satisfying ASTM B3-01 and B8-04.

Collectively, the ground conductors 12 may have a total cross-section of at least about one-half of the cross-section of a phase conductor 10, and may each be a soft-drawn tinned or bare copper conductor, such as a Class B stranded conductor satisfying ASTM B3-01 and B8-04. Suitable fillers include flame retardant paper and poly, by way of example and not limitation, and may be interspersed within the cable core design to force the ground conductors 12 into symmetrical, geometric location with their corresponding phase conductor 10 and a second phase conductor, within the grooves 16 between the phase conductors 10, as shown in FIG. 1.

In embodiments, the MC cable 100 further includes a layer of binder tape 18 which is tightly applied over the cable core to maintain the geometry of the cable core. The binder tape 18 may be made of Mylar, although other suitable materials are contemplated and used in the art. In embodiments, a layer of smooth copper tape 20 is applied helically over the layer of binder tape 18 to provide a primary (low-impedance, low-resistance) shield for the MC cable

100. The copper tape 20 of various embodiments has a thickness of from about 3 mil to about 5 mil, and has an overlap of about 50%, although other thicknesses and overlaps are contemplated. In embodiments, the overlap of the copper tape 20 ensures at least double tape thickness at all points in the MC cable 100, which facilitates the shield effectiveness even if the MC cable 100 is flexed or bent, which may otherwise lead to shield separation. The MC cable 100 further includes an interlocking strip of galvanized steel armor 22, which is applied in continuous contact with and complete coverage over the copper tape 20. The galvanized steel armor 22 provides a secondary (low-impedance) path for high frequency noise conduction for the cable. In embodiments, the galvanized steel armor 22 is applied with a tightness to prevent slippage of the core. In addition, the MC cable 100 includes a jacket 24. The jacket may be made of polyvinyl chloride (PVC) or a polyolefin, although other materials are known and used by those skilled in the art. In some embodiments, an inner jacket (not shown) is included between the binder tape 18 and the copper tape 20. When included, the inner jacket provides improved moisture resistance.

Figure 2:
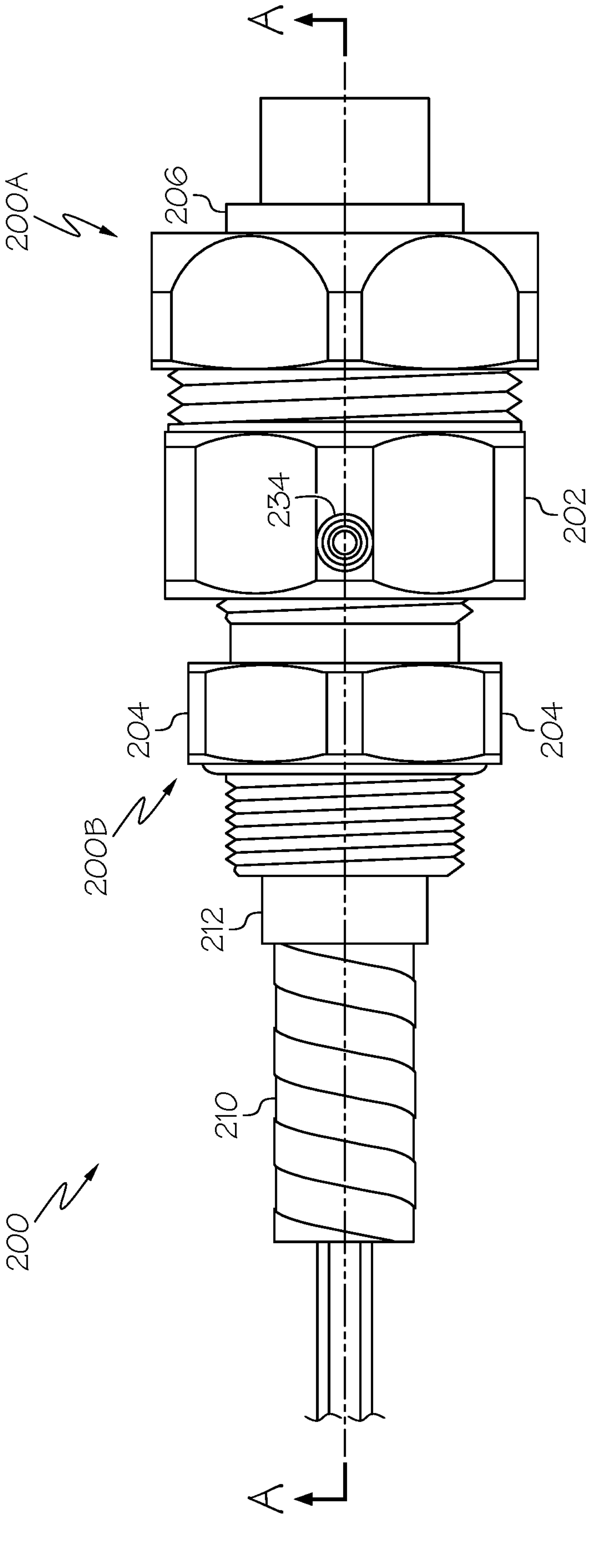
FIG. 2 illustrates an embodiment of a termination for use with the MC cable of FIG. 1, with the components assembled according to one or more embodiments shown and described herein.
Figure 3:
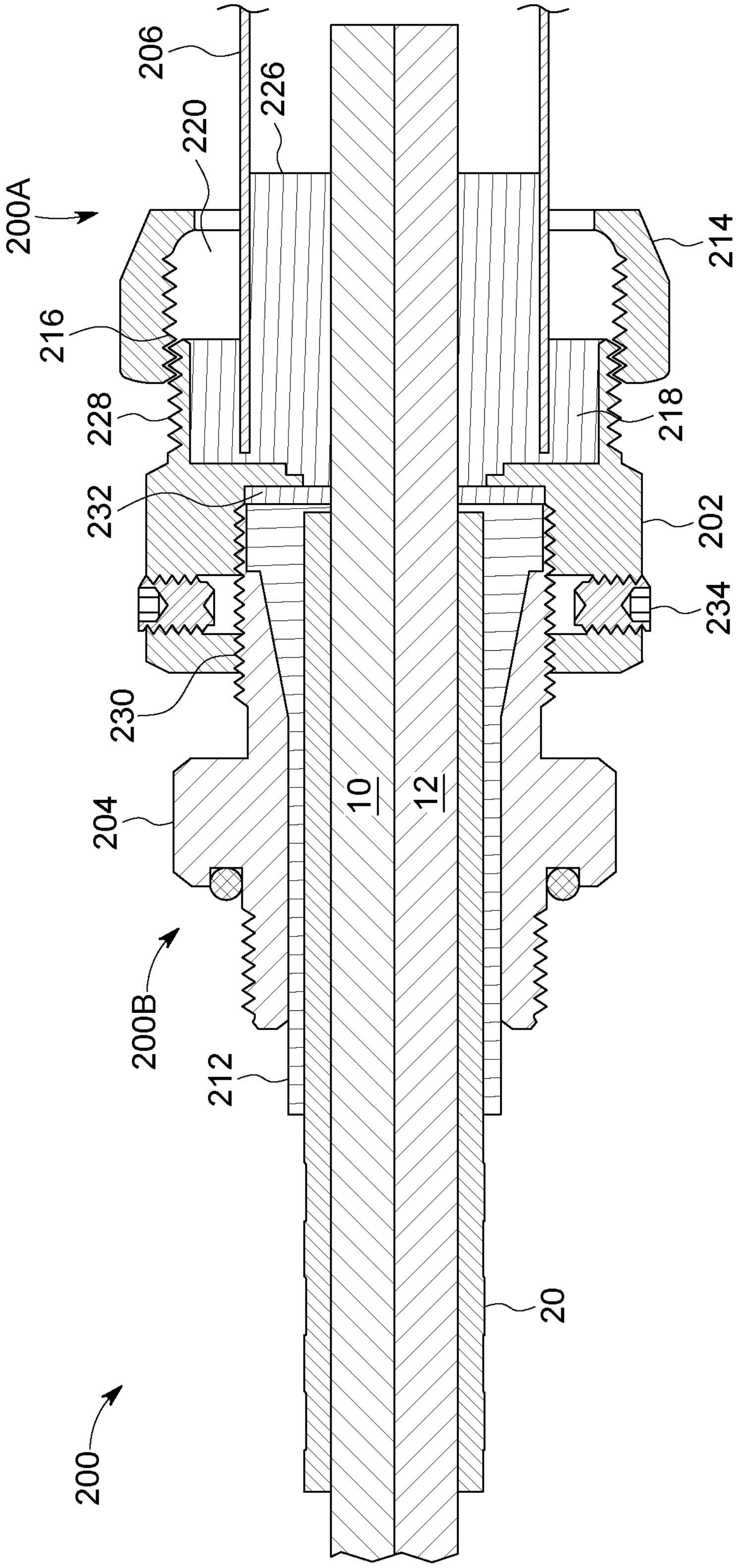
FIG. 3 illustrates a cross-section of the termination shown in FIG. 2 along the line A-A according to one or more embodiments shown and described herein.
Figure 4:
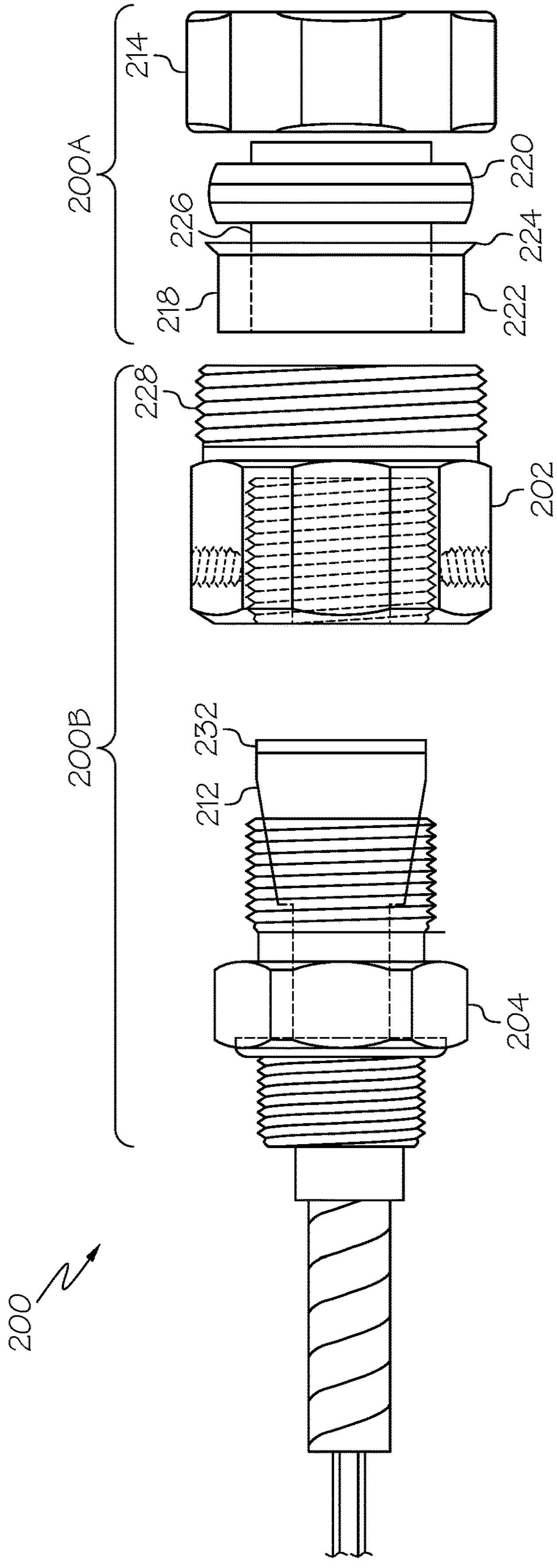
FIG. 4 is an exploded view of the termination of FIG. 2, with some components showing the interior structure thereof according to one or more embodiments shown and described herein.

FIGS. 2-4 illustrates an embodiment of a termination 200, which generally includes a first connector 200A, a second, reverse-threaded connector 200B, and, optionally, at least one braid (not shown in FIGS. 2-4) secured about the cable core. The first connector 200A includes an exterior metal body 202, which is configured to engage with the second, reverse-threaded connector 200B. In FIG. 2, a liquidtight conduit 206 is depicted surrounding and protecting an ASD cable, such as the MC cable 100, depicted in FIG. 1. As shown in FIG. 2, the MC cable 100 includes a copper shield formed from the copper tape 20. A collet sleeve 212, which terminates the copper tape 20, couples with the second, reverse-threaded connector 200B, as will be described in greater detail below.

In embodiments, the first connector 200A of the termination 200 includes a compression nut 214 having a partially threaded interior 216 extending around an aperture of the compression nut 214, a ferrule 218, and a securing washer 220. The compression nut 214, the ferrule 218, and the securing washer 220 are sized to receive and secure an end of the liquidtight conduit 206.

As can be seen in FIG. 4, which is an exploded view of the termination 200 of FIG. 2, the ferrule 218 includes a base 222 and a lip 224, extending circumferentially about the base 222. The lip 224 has a diameter that is greater than or equal to a diameter of the exterior metal body 202 such that the lip 224 does not pass through the aperture in the end of the exterior metal body 202. The ferrule 218 also includes a ferrule shaft 226 having a diameter that is sized to be received within the end of the liquidtight conduit 206. In particular, the ferrule shaft 226 has an exterior diameter that is smaller than an exterior diameter of the base 222 and is sized to contact an interior surface of the liquidtight conduit 206.

In various embodiments, the first connector 200A is coupled to the second, reverse-threaded connector 200B. As shown in FIGS. 2-4, the second, reverse-threaded connector 200B includes an exterior metal body 202 and an anti-friction washer 232. The second, reverse-threaded connector 200B also includes a male metal body 204 having an angled throat (shown in FIG. 3), which is coupled with the collet sleeve 212.

The exterior metal body 202 includes exterior threading 228 extending around an aperture of the exterior metal body 202 on a first end. The exterior threading 228 of the exterior metal body 202 corresponds with and is the inverse of the threaded interior 216 of the compression nut 214. The aperture of the first end of the exterior metal body 202 is sized to receive the base 222 of the ferrule 218 such that the lip 224 of the ferrule 218 sits circumferentially upon the first end of the exterior metal body 202 when the base 222 of the ferrule 218 is positioned within the aperture of the first end of the exterior metal body 202. As shown in FIG. 3, the exterior metal body 202 also includes interior threading 230 extending around an aperture of the exterior metal body 202 at a second end. The interior threading 230 is sized and configured to engage threading of the male metal body 204, as will be described below.

The compression nut 214 and the corresponding exterior threading 228 around the aperture of the exterior metal body 202 secure the cable connection within the exterior metal body 202. In particular, with the liquidtight conduit 206 positioned in the aperture of the compression nut 214, rotating the compression nut 214 about the exterior threading 228 of the first end of the exterior metal body 202 secures the ferrule 218 and the securing washer 220 with the liquidtight conduit 206, thereby securing the liquidtight conduit 206 within the fitting.

To connect the MC cable 100, the jacket 24 is stripped from the end of the MC cable 100, and the galvanized steel armor 22 is unlocked to near the beginning of the stripped-back jacket 24. The conductors 12 to be connected extend, independent of the filler 14 and wrap beyond the cable core a sufficient distance to allow connection. In some embodiments, electrical tape may be applied to the end of the cable core to ensure that the copper tape 20 is secured and will not unravel, but any electrical tape is removed prior to termination of the cable.

The exterior metal body 202 and the male metal body 204 with the collet sleeve 212 of the second, reverse-threaded connector 200B are slid onto the MC cable 100. The exterior metal body 202 is threaded onto the compression nut 214, which when positioned correctly will compress the liquidtight conduit 206. Next, the male metal body 204 and the collet sleeve 212 are threaded onto the exterior metal body 202 so that the collet sleeve 212 compresses the copper tape 20, but not the galvanized steel armor 22. In embodiments, set screws 234 on the exterior metal body 202 may be tightened to lock the threads of the exterior metal body 202 so that the termination 200 will not slip under vibration.

Figure 5:
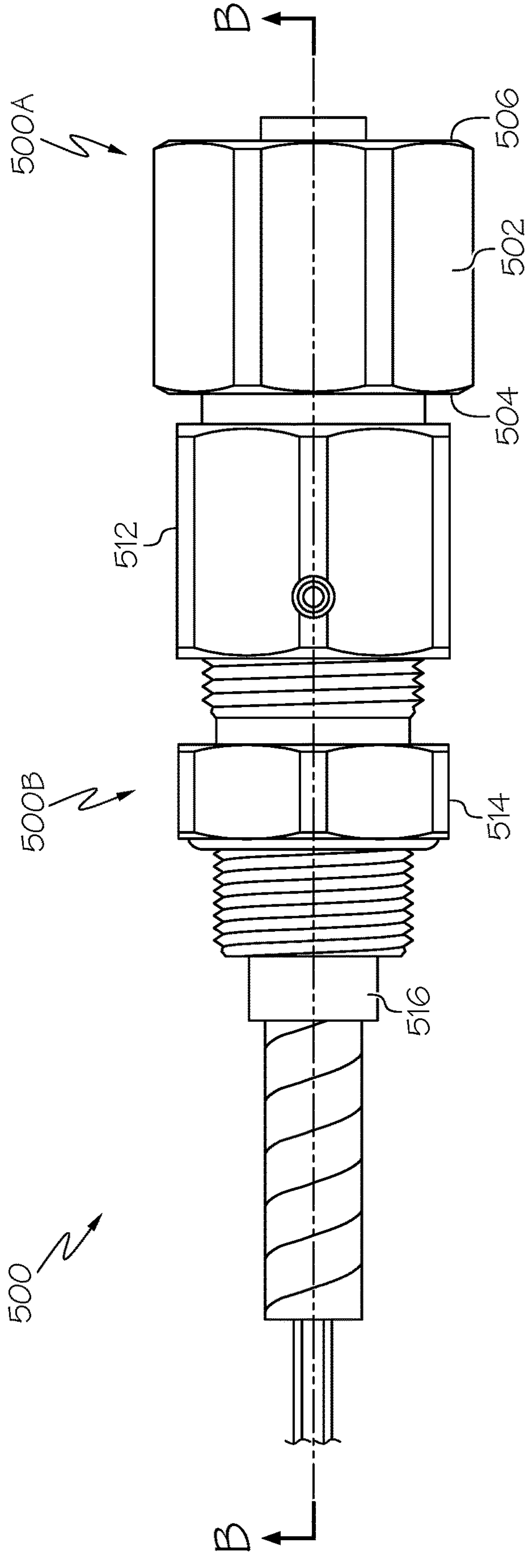
FIG. 5 illustrates another embodiment of a termination for use with the MC cable of FIG. 1, with the components assembled according to one or more embodiments shown and described herein.
Figure 6:
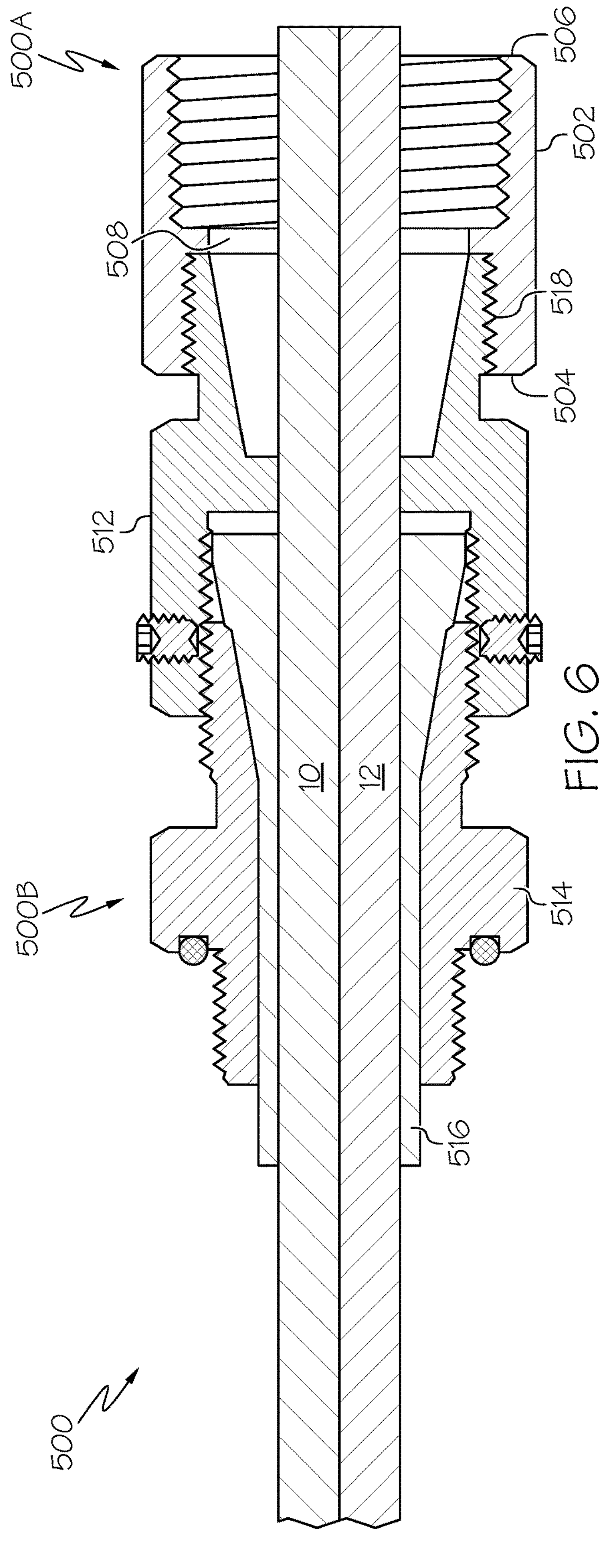
FIG. 6 illustrates a cross-section of the termination shown in FIG. 5 along the line B-B according to one or more embodiments shown and described herein.

Another embodiment of a termination 500 is illustrated in FIGS. 5 and 6. In particular, the termination 500 generally includes a first connector 500A, a second, reverse-threaded connector 500B, and at least one braid (not shown in FIGS. 5 and 6) secured about the cable core. In the embodiment shown in FIGS. 5 and 6, the first connector 500A includes a nut 502 having a first end 504 including interior threading and a second end 506 that is sized to receive conduit, such as a metal or PVC pipe or another type of conduit. The nut 502 is coupled with a rubber grommet 508. It is contemplated that the first connector 500A can have one of a variety of sizes to enable the first connector 500A to be used with various conduits.

In the embodiment depicted in FIGS. 5 and 6, the first connector 500A is coupled to the second, reverse-threaded connector 500B. As with the embodiment shown in FIGS. 2-4, the second, reverse-threaded connector 500B includes an exterior metal body 512 and a male metal body 514 having an angled throat (shown in FIG. 6), which is coupled with the collet sleeve 516. The second, reverse-threaded connector 500B is substantially identical to the second, reverse-threaded connector 200B described above.

In the embodiment depicted in FIGS. 5 and 6, the exterior threading 518 of the exterior metal body 512 corresponds with and is the inverse of the interior threading of the first end 504 of the nut 502. The aperture of the first end of the exterior metal body 512 is sized to receive the rubber grommet 508. The nut 502 and the corresponding exterior threading 518 around the aperture of the exterior metal body 512 secure the cable connection within the exterior metal body 512.

Figure 7:
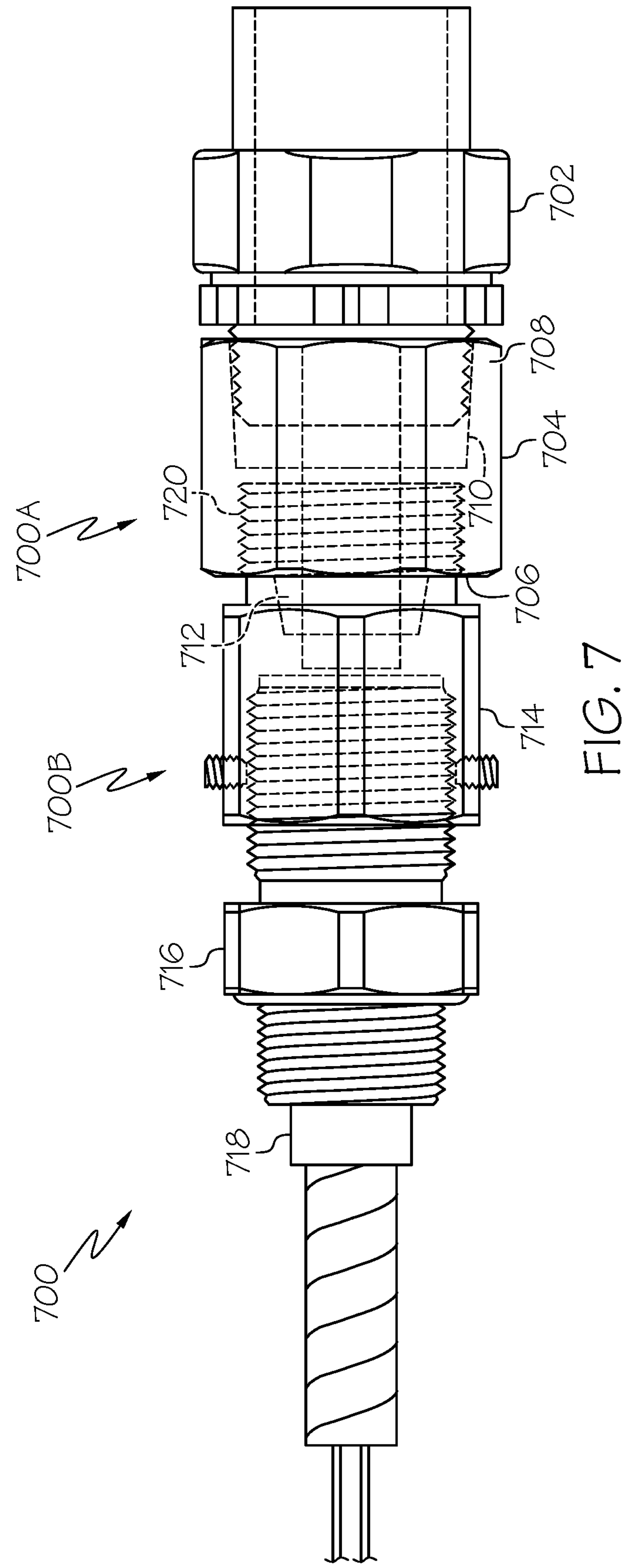
FIG. 7 illustrates another embodiment of a termination for use with the MC cable of FIG. 1, with the components assembled and with some components showing the interior structure thereof according to one or more embodiments shown and described herein.

Another embodiment of a termination 700 is illustrated in FIG. 7. In particular, the termination 700 generally includes a first connector 700A, a second, reverse-threaded connector 700B, and a liquidtight fitting 702. In embodiments, the termination 700 also includes at least one braid (not shown in FIG. 7) secured about the cable core.

In the embodiment shown in FIG. 7, the first connector 700A includes a nut 704 having a first end 706 including interior threading and a second end 708 that is sized to receive an end of the liquidtight fitting 702, as will be described in greater detail below. The nut 704 is coupled with a grounding seal 710 that includes metal tines 712.

As shown in FIG. 7, the first connector 700A is coupled to the second, reverse-threaded connector 700B. As with the embodiments described above, the second, reverse-threaded connector 700B includes an exterior metal body 714 and a male metal body 716, which is coupled with the collet sleeve 718. In embodiments, the second, reverse-threaded connector 700B is substantially identical to the second, reverse-threaded connector 200B and 500B described above.

In various embodiments, the exterior threading 720 of the exterior metal body 714 corresponds with and is the inverse of the interior threading of the first end 706 of the nut 704. The aperture of the first end of the exterior metal body 714 is sized to receive the metal tines 712 of the grounding seal 710.

The liquidtight fitting 702 includes a first end 722 sized to receive the liquidtight conduit and a second end 724 including external threading. In embodiments, the second end 708 of the first connector 700A includes internal threading that is the inverse of and corresponds with the exterior threading of the second end 724 of the liquidtight fitting 702.

Various embodiments described herein provide alternative connectors that enable the coupling of a cable through a conduit, such as liquidtight conduit, PVC pipe, or the like. The connectors, or terminations, include a first connector that can vary depending on the particular conduit for connection through, and a second, reverse-threaded connector that generally includes an exterior metal body and a male metal body coupled with a collet sleeve. Such terminations enable the conduit to be secured in place while the cable is connected through the termination.

It will be apparent to those skilled in the art that various modifications and variations can be made to embodiment of the present disclosure without departing from the spirit and scope of the disclosure. Thus, it is intended that the present disclosure cover such modifications and variations provided they come within the scope of the appended claims and their equivalents.

The invention claimed is:

1. A cable and termination system, comprising:
- a cable comprising a cable core and a copper tape shield surrounding the cable core;
- a conduit at least partially surrounding the cable; and
- a termination connector comprising an exterior metal body, a compression nut threadably engaged with the exterior metal body, a male metal body coupled with a collet sleeve and threadably engaged with the exterior metal body, and a ferrule, the ferrule comprising a ferrule shaft extending around an aperture of the exterior metal body, wherein the compression nut, when tightened, secures the conduit to the exterior metal body, and wherein the collet sleeve, when the male metal body is tightened, compresses and secures the copper tape shield to the exterior metal body.

2. The cable and termination system of claim 1, wherein the conduit is a liquidtight conduit.

3. The cable and termination system of claim 1, wherein the compression nut comprises a partially threaded interior.

4. The cable and termination system of claim 1, wherein the compression nut engages the exterior metal body via threading that is inverse of the threading between the male metal body and the exterior metal body.

5. The cable and termination system of claim 1, wherein the cable comprises three ground conductors.

6. The cable and termination system of claim 1, wherein the compression nut engages the exterior metal body via threading that is the inverse of the threading by which the male metal body engages the exterior metal body.

7. The cable and termination system of claim 1, wherein the cable comprises an MC cable.

8. The cable and termination system of claim 7, wherein the MC cable further comprises a layer of binder tape applied over the cable core.

9. The cable and termination system of claim 1, wherein the conduit is separate from the cable.

* * * * *